United States Patent

Jamrus

[11] Patent Number: 5,253,407
[45] Date of Patent: Oct. 19, 1993

[54] CONTROL ROD DRIVE ENDCAP TOOL

[75] Inventor: Kenneth J. Jamrus, San Jose, Calif.
[73] Assignee: General Electric Company, San Jose, Calif.
[21] Appl. No.: 749,349
[22] Filed: Aug. 23, 1991
[51] Int. Cl.⁵ ............................................. B23P 19/04
[52] U.S. Cl. ...................................... 29/266; 29/245; 29/723
[58] Field of Search .............. 29/214, 245, 256–259, 29/263–265, 723, 266, 280

[56] References Cited

U.S. PATENT DOCUMENTS

| | | | |
|---|---|---|---|
| 1,865,420 | 6/1932 | Kick | 29/256 |
| 2,650,419 | 9/1953 | Barbisch | 29/266 |
| 2,860,407 | 11/1958 | Grunder et al. | 29/258 |
| 3,177,571 | 4/1965 | Carlson et al. | 29/245 |
| 3,579,796 | 5/1971 | Fillion | 29/263 |
| 3,921,440 | 11/1975 | Toth . | |
| 4,057,889 | 11/1977 | Ferguson | 29/280 X |
| 4,287,653 | 9/1981 | Bloch | 29/256 |
| 4,288,900 | 9/1981 | Overton | 29/266 X |
| 4,463,489 | 8/1984 | James | 29/259 |
| 4,562,631 | 1/1986 | Welch | 29/259 |
| 4,893,395 | 1/1990 | Crowder | 29/259 |
| 5,070,589 | 12/1991 | Howell et al. | 29/723 X |

FOREIGN PATENT DOCUMENTS

| | | | |
|---|---|---|---|
| 1555740 | 11/1967 | France . | |
| 2353769 | 12/1977 | France . | |
| 77866 | 10/1977 | Luxembourg . | |
| 300032 | 11/1928 | United Kingdom | 29/258 |

OTHER PUBLICATIONS

D. R. Wilkins et al, "Advanced BWR: Design Improvements Build on Proven Technology," Jun. 1986 reprint from *Nuclear Engineering International*, pp. 1–7 and drawing on 6 sheets.

Primary Examiner—Mark Rosenbaum
Assistant Examiner—Peter Dungba Vo
Attorney, Agent, or Firm—John S. Beulick

[57] ABSTRACT

A tool is disclosed for assembling or disassembling an endcap into or out of a housing. The housing includes a distal end, an intermediate portion, and a receptacle disposed in the distal end. The tool includes a hook removably joinable to the endcap, and a clamp removably joinable to the housing intermediate portion. The hook is jacked relative to the clamp for translating the endcap relative to the receptacle for either assembling or disassembling the endcap into or out of the housing.

11 Claims, 7 Drawing Sheets

CONTROL ROD DRIVE ENDCAP TOOL

TECHNICAL FIELD

The present invention relates generally to nuclear reactor control rod drives, and, more specifically, to a tool for assembling and disassembling a portion thereof.

BACKGROUND ART

A conventional boiling water reactor includes a plurality of control rod drives (CRDs) mounted to a reactor pressure vessel, each of which includes an output rod extending therefrom for selectively inserting and withdrawing conventional control rods into and out of a conventional reactor core for controlling reactivity thereof.

The CRDs include many components and are initially assembled in a manufacturing plant and then installed into the reactor pressure vessel. During operation of the reactor, the CRDs are subject to nuclear radiation and become contaminated. Routine maintenance of the CRDs requires disassembly thereof, and since the CRDs have been contaminated, maintenance personnel must wear suitable protective clothing including, for example, plastic hoods, and triple gloves which decrease visibility and dexterity for performing the maintenance operation.

In one CRD design, the CRD includes a housing endcap which has an outer diameter slightly less than the inner diameter of a complementary mounting receptacle of the housing in which it is inserted. This tight clearance between the endcap and the housing receptacle results in cocking of the endcap during disassembly of the endcap from the housing if the endcap is not uniformly withdrawn from the receptacle. The cocking of the endcap in the receptacle will cause the endcap to bind and therefore prevent its disassembly therefrom. Since the CRD has been contaminated due to operation in the reactor pressure vessel, the protective clothing worn by the maintenance personnel increases the difficulty in removing the endcap without cocking and resulting binding thereof.

OBJECTS OF THE INVENTION

Accordingly, one object of the present invention is to provide a tool for assembling and disassembling an endcap into and out of a housing.

Another object of the present invention is to provide a tool for disassembling an endcap from a housing of a nuclear reactor control rod drive.

Another object of the present invention is to provide a tool which is removably mountable to a housing for assembling and disassembling an endcap thereto and therefrom.

Another object of the present invention is to provide a tool for removing an endcap from a housing without cocking thereof.

DISCLOSURE OF INVENTION

A tool is disclosed for assembling or disassembling an endcap into or out of a housing. The housing includes a distal end, an intermediate portion, and a receptacle disposed in the distal end. The tool includes a hook removably joinable to the endcap, and a clamp removably joinable to the housing intermediate portion. Means for jacking the hook relative to the clamp are provided for translating the endcap relative to the receptacle for either assembling or disassembling the endcap into or out of the housing.

BRIEF DESCRIPTION OF DRAWINGS

The novel features believed characteristic of the invention are set forth and differentiated in the claims. The invention, in accordance with a preferred, exemplary embodiment, together with further objects and advantages thereof, is more particularly described in the following detailed description taken in conjunction with the accompanying drawings in which:

MODE(S) FOR CARRYING OUT THE INVENTION

Figure 1:
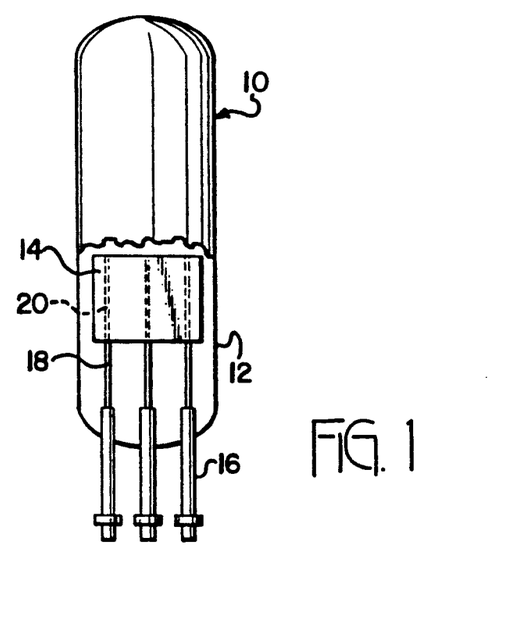
FIG. 1 is a schematic, elevation view of an exemplary nuclear reactor having a plurality of control rod drives.

Illustrated in FIG. 1 is a schematic representation of an exemplary boiling water nuclear reactor 10. The reactor 10 includes a conventional pressure vessel 12 in which is disposed a conventional nuclear reactor core 14. A plurality of conventional control rod drives (CRDs) 16, only three exemplary ones thereof being illustrated, are conventionally mounted to the lower head of the pressure vessel 12. Each of the CRDs 16 includes an output rod 18 conventionally joined to a conventional control rod 20. The CRDs 16 are conventionally operated for either inserting into the core 14 or withdrawing from the core 14 the control rods 20 for selectively controlling reactivity of the core 14.

Figure 2:
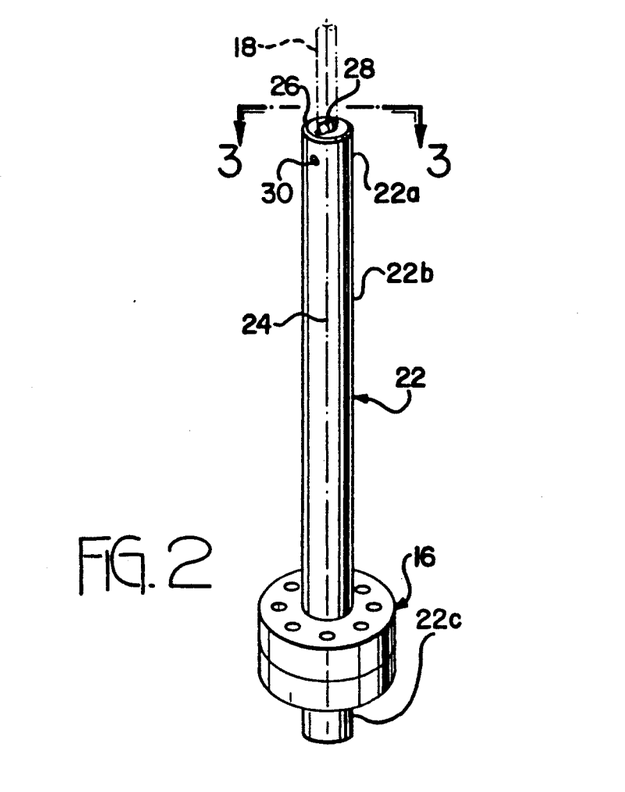
FIG. 2 is a perspective view of one of the control rod drives illustrated in FIG. 1 showing an endcap which is removable and insertable by a tool in accordance with the present invention.

Illustrated in FIG. 2 is one of the CRDs 16 shown in an exemplary embodiment and including an elongate, tubular housing 22 having a longitudinal centerline axis 24. The housing 22 includes a distal end 22a, an intermediate portion 22b extending integrally from the distal end 22a, and a bottom portion 22c which includes a conventional motor and brake for selectively powering and stopping the CRD 16. The CRD 16 is typically supported in the pressure vessel 12 along its intermediate portion 22b, and as shown in FIG. 2 has been removed from the pressure vessel 12. The output rod 18, shown in phantom in FIG. 2, has also been conventionally removed from the CRD 16.

The CRD 16 also includes an elongate, tubular endcap 26 having an outlet 28 through which the output rod 18 extends when installed in the CRD 16. In the exemplary embodiment illustrated, the endcap 26 is mounted into the housing distal end 22a with a close fit and secured therein by a plurality of circumferentially spaced, conventional shear pins 30.

Figure 3:
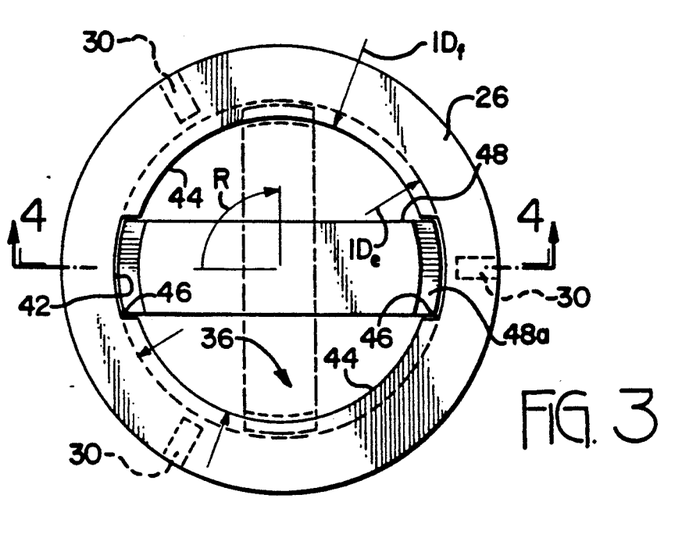
FIG. 3 is a top view of the control rod drive illustrated in FIG. 2 taken along line 3—3 showing the endcap thereof and a portion of the tool used for assembling and disassembling the endcap thereto.
Figure 4:
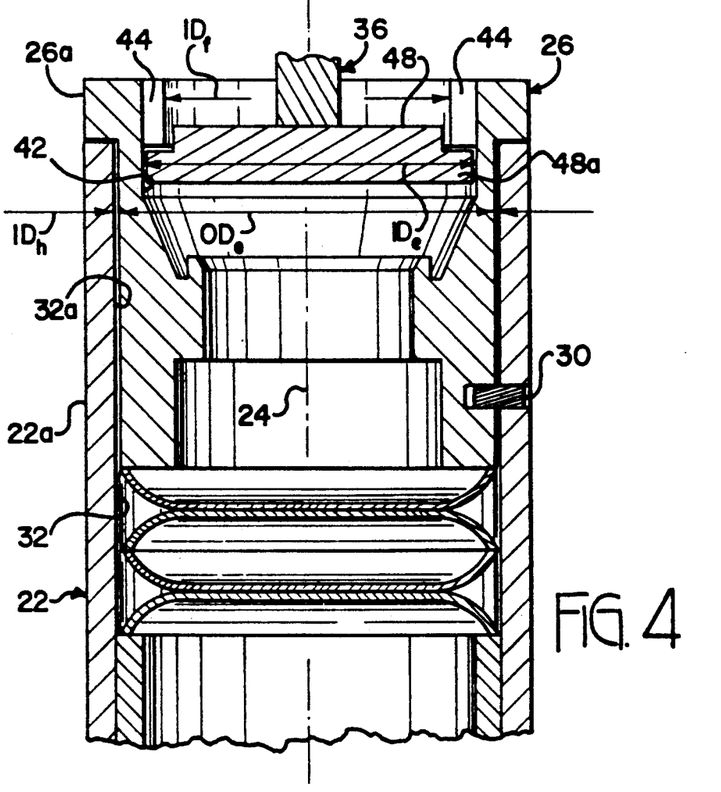
FIG. 4 is a longitudinal sectional view of the distal end of the control rod drive illustrated in FIG. 3 taken along line 4—4.

More specifically, FIGS. 3 and 4 illustrate in more particularly the housing distal end 22a and the endcap 26 mounted therein. The housing 22 includes an annular bore 32 having an inner diameter $ID_h$, the distal end of which defines an annular receptacle 32a in which is positioned the endcap 26. The endcap 26 has an outer diameter $OD_e$ which is slightly smaller than the housing inner diameter $ID_h$, and for example, the difference therebetween defines a clearance of about 2 mils (0.05 mm). In order to assemble or disassemble the endcap 26 in the receptacle 32a, the endcap 26 must be translated substantially parallel to the centerline axis 24 to prevent cocking of the endcap 26 in the receptacle 32a which would result in binding of the endcap 26 therein.

Figure 5:
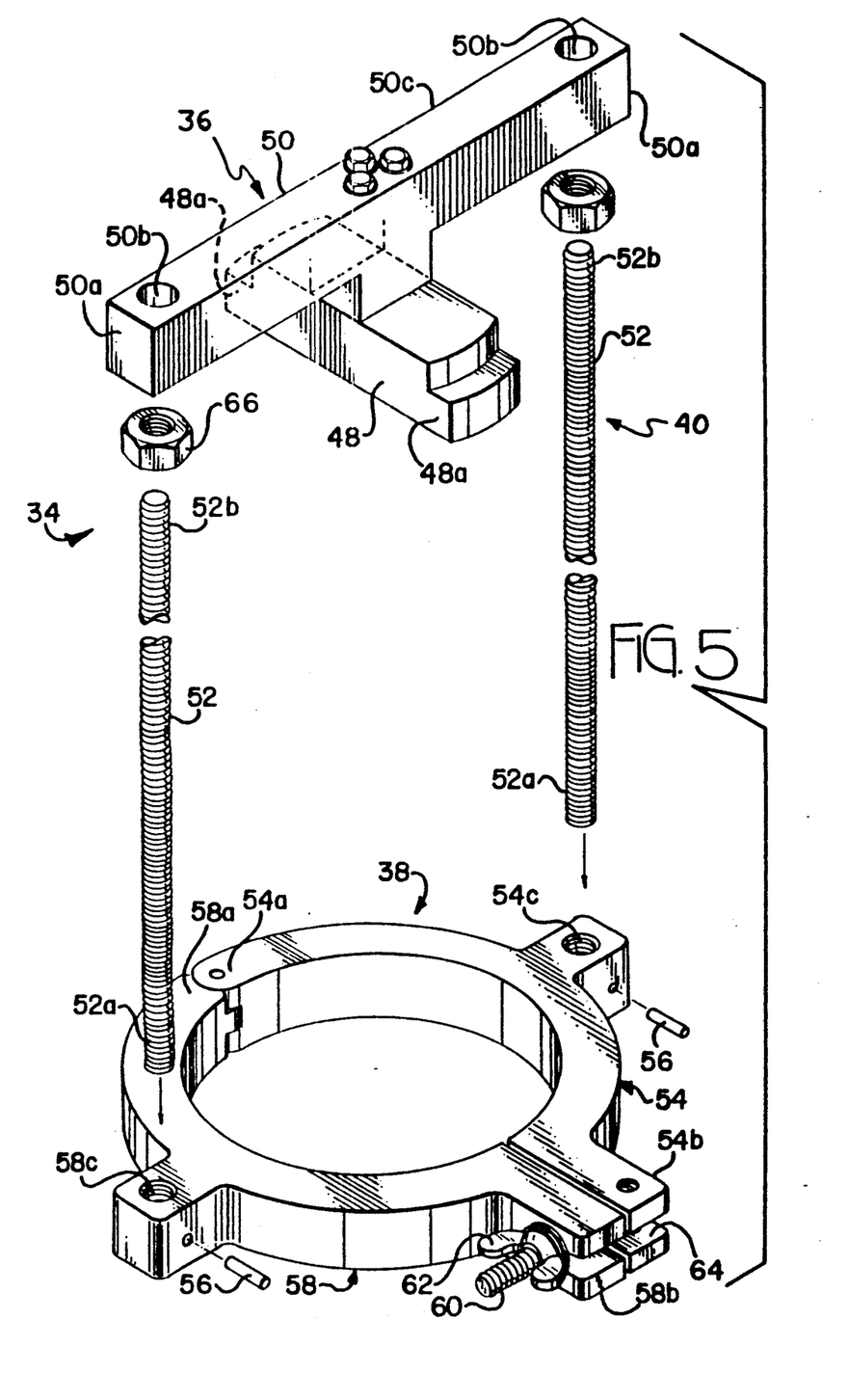
FIG. 5 is an exploded, perspective view of a tool in accordance with one embodiment of the present invention for assembling and disassembling the endcap illustrated in FIGS. 3 and 4 from the control rod drive.

In accordance with the present invention, a tool 34, as shown in exploded view in FIG. 5 is provided for disassembling the endcap 26 from the housing 22, as well as assembling, or reassembling, the endcap 26 thereto during a maintenance operation of the CRD 16. The tool 34 is relatively easy to assemble to and remove from the housing 22 by a maintenance worker wearing protective clothing for protection against nuclear contamination from the CRD 16. In an exemplary embodiment of the tool 34, a hook 36 is provided and is removably joinable to the endcap 26 for either assembling or disassembling the endcap 26 to or from the housing 22. The tool 34 also includes a clamp 38 which is removably joinable to the housing intermediate portion 22b for providing a support on the housing 22 against which the hook 36 may be moved. The tool 34 also includes means 40 for jacking the hook 36 relative to the clamp 38 for translating the endcap 26 relative to the housing receptacle 32a. The tool may take various forms depending upon the particular form of the CRD 16.

For example, the exemplary endcap 26 illustrated in FIGS. 3 and 4 includes a bore 42 having an inner diameter $ID_e$, and a pair of arcuate flanges 44 at a distal end 26a of the endcap 26 which extend over the endcap bore 42 and have an inner diameter $ID_f$ which is suitably less than that of the inner diameter $ID_e$. The two flanges 44 are circumferentially spaced apart from each other to define a pair of access slots 46 for receiving the hook 36.

More specifically, and referring to FIG. 5, the hook 36 preferably includes an elongate first cross member 48 having an integral pair of spaced apart flanges 48a. The hook 36 also includes an elongate second cross member 50 suitably fixedly joined to the first cross member 48, by bolts for example, and is disposed in this exemplary embodiment at 90° relative to the first cross member 48.

Figure 7:
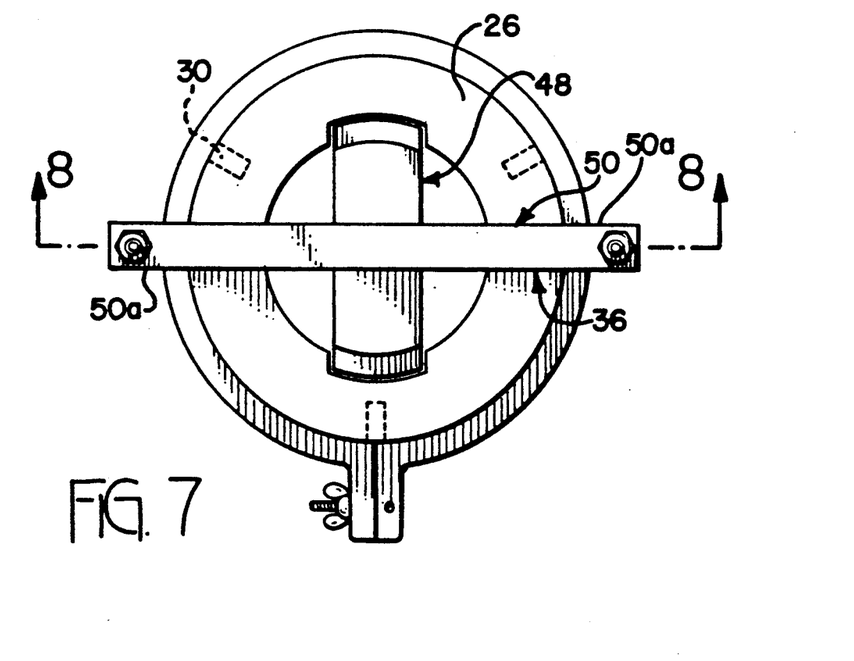
FIG. 7 is a top view of the control rod drive illustrated in FIG. 2 showing the assembly of the endcap by the tool illustrated in FIG. 5.
Figure 8:
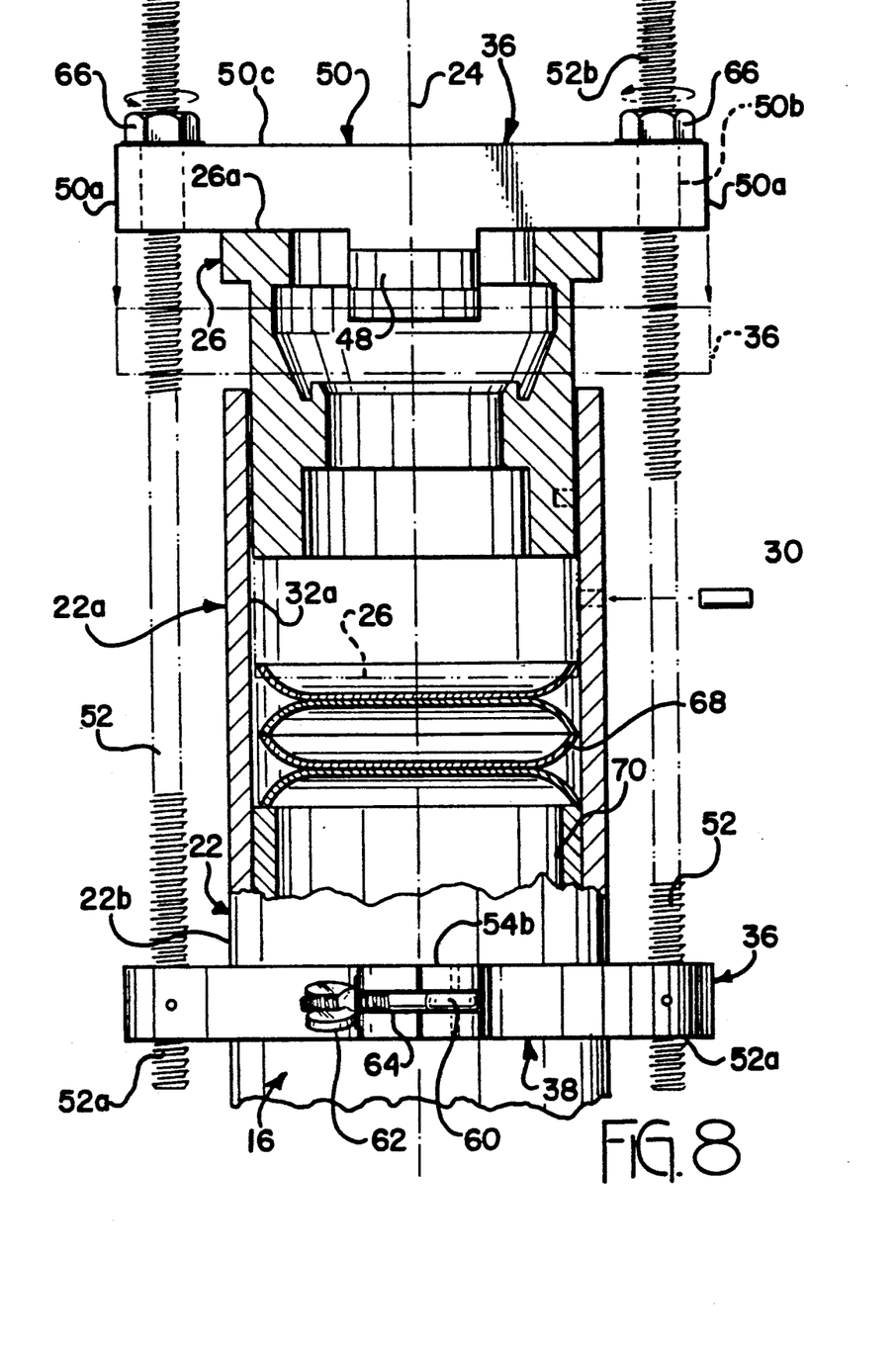
FIG. 8 is a longitudinal, partly sectional view of the top of the control rod drive illustrated in FIG. 7 taken along line 8—8 with the tool positioned thereon for assembling the endcap thereto.

The second cross member 50 includes a pair of spaced apart distal ends 50a which extend outwardly away from both the endcap 26 and the housing 22 as illustrated in FIGS. 7 and 8 for joining the hook 36 to the jacking means 40. More specifically, the jacking means 40 in the exemplary embodiment illustrated in FIGS. 5, 7, and 8, include a pair of jacking rods or screws 52 joined between the clamp 38 and respective ones of the second cross member distal ends 50a for translating the hook 36.

In the exemplary embodiment illustrated in FIG. 5, the clamp 38 includes a first arcuate half-clamp 54 having a first proximal end 54a, a first distal end 54b, and a first aperture 54c disposed in the first half-clamp 54 between the proximal and distal ends 54a, 54b for fixedly receiving a proximal end 52a of a first one of the jack screws 52. For example, the jack screw 52 may be threadingly inserted into the aperture 54c and then fixedly connected thereto by a conventional retention pin 56 inserted through the first half-clamp 54, the aperture 54c, and the screw proximal end 52a. The clamp 38 also includes a second arcuate half-clamp 58 having a second proximal end 58a pivotally joined to the first proximal end 54a, by hinge pin for example, a second distal end 58b releasably joinable to the first distal end 54b for clamping the first and second half-clamps 54, 58 around the housing 22, and a second aperture 58c disposed in the second half-clamp 58 between the proximal and distal ends 58a, 58b for fixedly receiving the proximal end 52a of a second one of the jack screws 52 in the same manner as for the first jack screw 52 described above.

Figure 6:
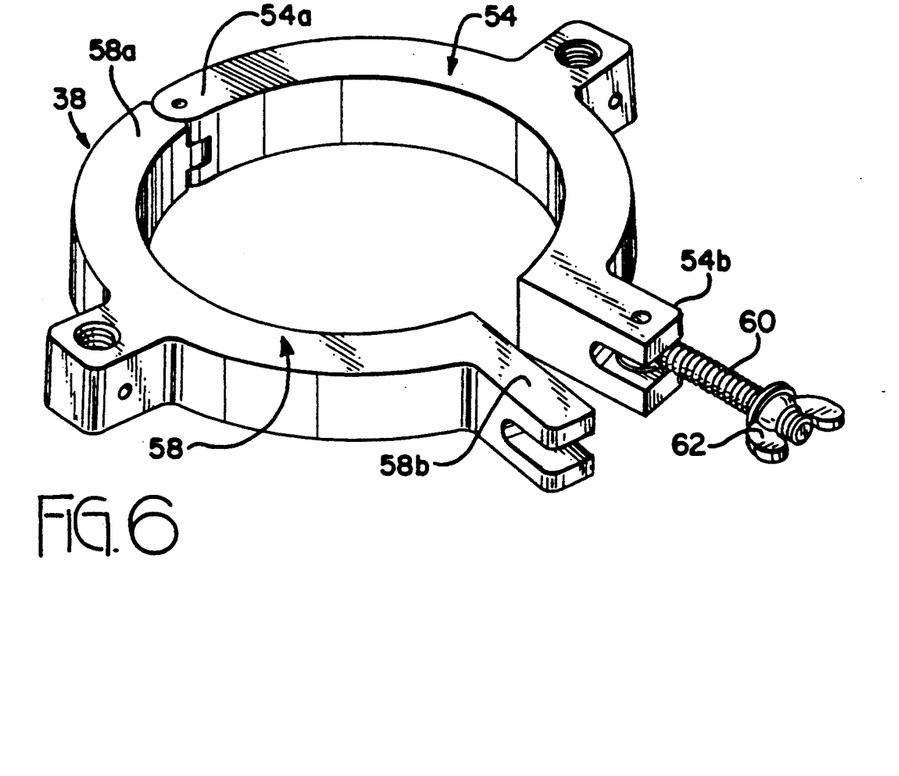
FIG. 6 is a perspective view of a clamp used in the tool illustrated in FIG. 5 shown in a partially open position.

The clamp 38 is illustrated in a partially open position in FIG. 6 with the two half-clamps 54, 58 being pivoted about their joined proximal ends 54a, 58a. The clamp 38, including the two jack screws 52 attached thereto, may then be positioned around the housing 22 as shown in FIG. 8 with the two half-clamps 54, 58 being closed together. The two half-clamps 54, 58 may be suitably clamped together around the housing 22 by a bolt 60 and wing nut 62 for example. The bolt 60 may be conventionally pivotally joined to the first distal end 54b of the first half-clamp 54 so that it may be positioned in a U-shaped slot 64 disposed in the second distal end 58b of the second half-clamp 58. The wing nut 62 may be tightened for drawing together the two distal ends 54b, 58b, thusly clamping the two half-clamps 54, 58 around the housing 22.

Referring again to FIG. 8, the clamp 36 is suitably clamped to the housing intermediate portion 22b with the jack screws 52 extending upwardly therefrom and above the housing distal end 22a. The endcap 26 may be initially manually positioned at the entrance to the receptacle 32a, and in view of the tight clearance between the endcap 26 and the receptacle 32a the hook 36 is provided for pushing the endcap 26 into the receptacle 32a.

More specifically, the second cross member 50 as shown in FIG. 5 includes a pair of apertures 50b extending through the distal ends 50a thereof for receiving respective distal ends 52b of the jack screws 52. Referring again to FIG. 8, the hook 36 may simply be positioned over the jack screws 52 so that the apertures 50b slide downwardly over the jack screw distal ends 52b toward the clamp 36. The second cross member 50 is then positioned against the distal end 26a of the endcap 26.

The jacking means 40 in this exemplary embodiment further include a pair of jacking nuts 66 disposed on respective ones of the jack screws 52 which are rotated substantially simultaneously in a clockwise direction looking downwardly toward the endcap 26 (for the right-hand threads of jack screws 52) until they rest against a top surface 50c of the second cross member 50. By continuing to rotate equally the nuts 66 in the clockwise direction, the hook 36 is jacked downwardly so that the second cross member 50 pushes the endcap 26 into the receptacle 32a. By equally turning both nuts 66, the jacking means 40 are effective for uniformly translating the endcap 26 parallel to the longitudinal axis 24 inside the receptacle 32a for inserting the endcap 26 therein without binding due to cocking thereof.

In the exemplary embodiment of the CRD 16 illustrated in FIG. 8, a plurality of conventional Belleville springs 68 are disposed inside the housing 22 and on top of a conventional piston 70 therein. The endcap 26 is jacked downwardly by the hook 36 against the top of the Belleville springs 68 which may then be compressed against the piston 70 by the force exerted by the two nuts 66 being rotated on the screws 52. The reaction forces due to friction against the endcap 26 being pushed into the receptacle 32a and due to compression of the Belleville springs 68 is carried through the screws 52, the clamp 36, and to the housing 22. Once the endcap 26 is fully inserted into the receptacle 32a, thusly compressing the Belleville springs 68, the several shear pins 30 may be inserted through the respective holes in the housing 22 and into respective holes in the endcap 26 for retaining the endcap 26 to the housing distal end 22a. The nuts 66 may then be rotated counterclockwise and removed from the screws 52. The hook 36 may then be slidingly lifted off the screws 52, and then the clamp 36 may be removed from the housing 22 by unscrewing the wing nut 62 for releasing the clamping force generated thereby.

The tool 34, is accordingly, effective for assembling, or reassembling, the endcap 26 to the housing 22 at the end of the maintenance operation. However, the tool 34 may be used for disassembling the endcap 26 from the housing 22, with the jacking means 40 being effective for withdrawing, or removing, the endcap 26 from the receptacle 32a.

More specifically, the tool 34 is firstly assembled around the housing 22 as illustrated in FIG. 8 for inserting the endcap 26 in the receptacle 32a. The nuts 66 are again positioned on the top surface 50c of the first cross member 50 and initially tightened for further compressing the Belleville springs 68 in order to relieve the shear loads on the shear pins 30. The shear pins 30 may be removed by any conventional means, and then the nuts 66 may be rotated counterclockwise and removed from the screws 52. The hook 36 is then removed from the screws 52, and the clamp 38 is removed or repositioned as described below.

Figure 9:
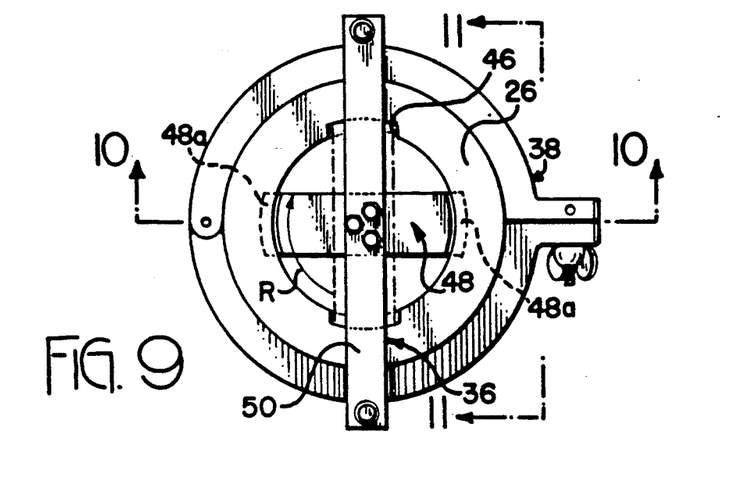
FIG. 9 is a top view of the control rod drive illustrated in FIG. 2 showing the tool mounted thereto for disassembling the endcap therefrom.

For assembling the endcap 26 into the receptacle 32a, the second cross member 50 is used for exerting a downward force against the endcap 26. However, in order to remove the endcap 26 from the receptacle 32a an upward force is needed, and is provided through the first cross member 48 of the hook 36. More specifically, the hook 36 is positioned, or repositioned over the endcap 26 as shown in FIGS. 3 and 4 after the pins 30 have been removed, with the first cross member 48 being inserted downwardly through the access slots 46 into the bore 42 and below the endcap flanges 44. The hook 36 is then rotated in either a counterclockwise direction, or a clockwise direction as shown in phantom in FIG. 3 to an angle R, of about 90° for example, so that the first cross member flanges 48a are fully positioned away from the access holes 46 and under the endcap flanges 44. FIG. 9 illustrates the hook 36 rotated at the angle R of about 90° from its initial position in the access slots 46. The hook 36 may be so positioned in the endcap 26 for also inserting the endcap 26 into the receptacle 32a as described above although it is not necessary since the second cross member 50 provides the downward insertion force, and the first cross member 48 is provided solely for centering the hook 36 over the endcap 26.

Figure 10:
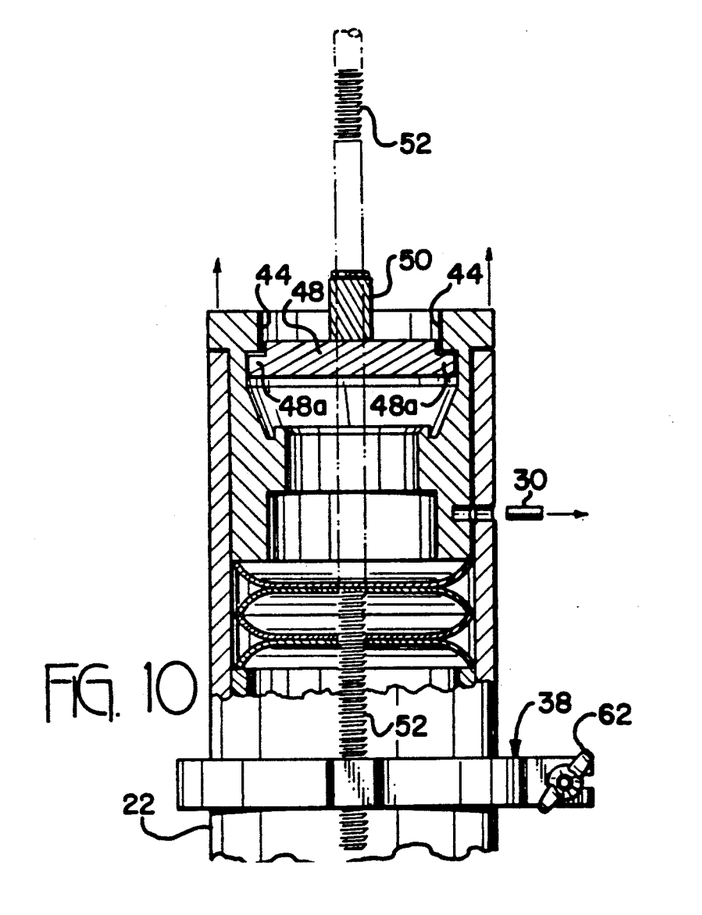
FIG. 10 is a longitudinal, partly sectional view of the top of the control rod drive illustrated in FIG. 9, including the tool mounted thereon, taken along line 10—10.
Figure 11:
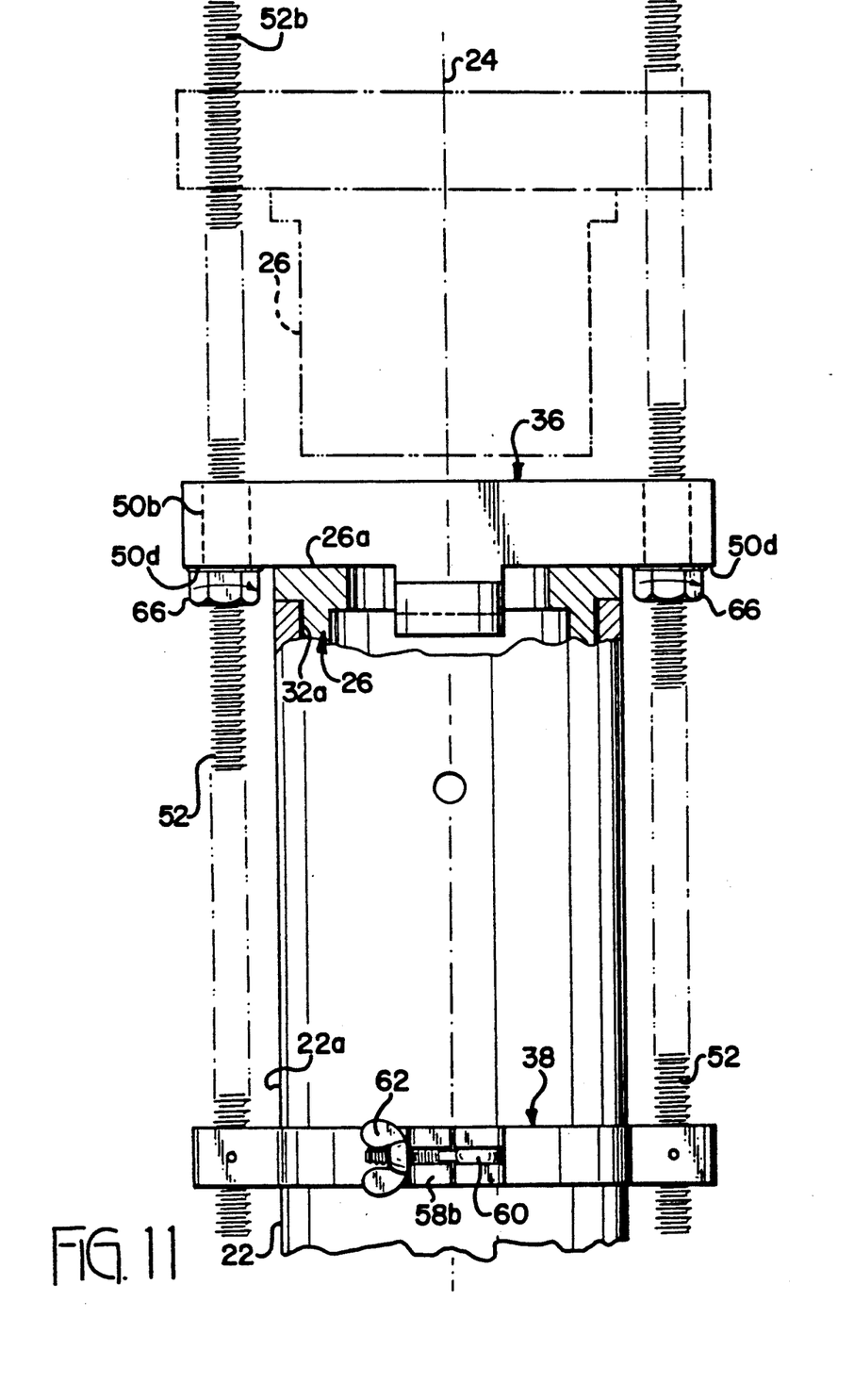
FIG. 11 is a longitudinal, partly sectional view of the top of the control rod drive and tool illustrated in FIG. 9 taken along line 11—11.

Once the hook 36 is so positioned into the endcap 26, the clamp 38 may be assembled, or repositioned, around the housing 22, as illustrated in FIGS. 9–11, with the nuts 66 being firstly threaded downwardly on the screws 52 below the endcap distal end 26a and then the screw distal ends 52b are inserted upwardly through the second member apertures 50b and sufficiently above the hook 36 to allow for disassembly of the endcap 26 from the receptacle 32a. The clamp 38 is then suitably clamped to the housing intermediate portion 22a by tightening the wing nuts 62 on the bolt 60 against the second half-clamp distal end 58b to secure the clamp 38 to the housing 22. The nuts 66 are then rotated counterclockwise, when viewed downwardly on the endcap 26 so that they press against a bottom surface 50d of the second cross member 50 and are then rotated uniformly for jacking the hook 36 upwardly, and in turn jacking the endcap 26 upwardly and out of the receptacle 32a. The first cross member flanges 48a accordingly contact the bottom surfaces of the endcap flanges 44, as shown most clearly in FIG. 10, for exerting an upward force thereagainst to withdraw the endcap 26 from the receptacle 32a. In this way, the jacking means 40 are effective for uniformly translating the endcap 26 parallel to the centerline axis 24 for withdrawing the endcap 26 from the receptacle 32a without binding therein due to cocking of the endcap 26. The endcap 26 is shown in phantom in FIG. 11 fully withdrawn from the receptacle by equally rotating the nuts 66 on the jack screws 52. The nuts 66 may be rotated simultaneously by a single maintenance worker using two suitable wrenches, one in each hand.

Accordingly, as disclosed above, the tool 34 may be simply assembled to the CRD 16 for either withdrawing the endcap 26 from the receptacle 32a or inserting it therein. The clamp 38 allows for simple positioning and clamping of the tool 34 to the housing 22 as required for positioning the jack screws 52 and the hook 36 relative to the endcap 26. The clamp 38 allows the first cross member 48 to be positioned downwardly through the endcap access slots 46 and then rotated under the endcap flanges 44 so that the withdrawal force may be applied against the endcap 26 by the jacking means 40. The clamp 38 allows simple clamping of the tool 34 to the housing 22 at any suitable rotation angle relative thereto and at any required longitudinal position on the housing 22 as required. The clamp 38 is positioned on the housing 22 for both assembling or disassembling the endcap 36 thereto with the screw distal ends 52b being disposed suitably above the receptacle 32a so that the hook 36 joined to the endcap 26 may be forced downwardly by the nuts 66 disposed on the top surface 50c of the second cross member 50, or forced upwardly by the nuts 66 repositioned on the bottom surface 50d thereof for lifting the endcap 26. In both operations, the screws 52 are positioned for allowing adequate travel of the endcap 26 from its initial position and fully into the receptacle 32a, or from its inserted position and removed fully outwardly from the receptacle 32a.

While there has been described herein what is considered to be a preferred embodiment of the present invention, other modifications of the invention shall be apparent to those skilled in the art from the teachings herein, and it is, therefore, desired to be secured in the appended claims all such modifications as fall within the true spirit and scope of the invention.

For example, although the tool 34 is provided in particular for removing the endcap 26 from the housing 22 of the CRD 16, it may be used for removing analogous endcaps or components from analogous housings in any type of structure. Furthermore, alternate embodiments of the clamp 38 may also be used, alternate types of jacking means 40 may also be used, and alternate types of the hooks 36 may also be used.

Accordingly, what is desired to be secured by Letters Patent of the United States is the invention as defined and differentiated in the following claims:

1. A tool for translating an endcap inside a receptacle of an elongate housing including a distal end, an intermediate portion extending integrally from said distal end, and said receptacle being disposed in said distal end, said endcap including a bore and a pair of arcuate flanges at a distal end thereof spaced circumferentially apart to define a pair of access slots, said tool comprising:
   a hook removably joinable to said endcap, said hook including a first cross member having an integral pair of spaced apart flanges positionable through said endcap access slots and under said endcap flanges for applying thereagainst force from said jacking means for withdrawing said endcap from said receptacle;
   a clamp removably joinable to said housing intermediate portion, and including:
      a first arcuate half-clamp having a first proximal end, a first distal end, and a first aperture disposed between said first proximal and distal ends; and
      a second arcuate half-clamp having a second proximal end pivotally joined to said first proximal end, a second distal end releasably joinable to said first distal end for clamping said first and second half-clamps around said housing, and a second aperture disposed between said second proximal and distal ends; and
   means for jacking said hook relative to said clamp for translating said endcap relative to said receptacle including a pair of jacking rods joined between said clamp and said hook, with a first one of said jacking rods having a proximal end fixedly joined to said first half-clamp first aperture, and a second one of said jacking rods having a proximal end fixedly joined to said second half-clamp second aperture.

2. A tool according to claim 1 wherein said jacking means are effective for uniformly translating said endcap inside said receptacle without binding therein due to cocking of said endcap.

3. A tool according to claim 2 wherein said jacking means are effective for inserting said endcap into said receptacle.

4. A tool according to claim 2 wherein said jacking means are effective for withdrawing said endcap from said receptacle.

5. A tool according to claim 2 wherein said hook further includes a second cross member fixedly joined to said first cross member for joining said hook to said jacking means.

6. A tool according to claim 5 wherein:
   said second cross member is elongate and includes a pair of distal ends extending outwardly away from said endcap; and
   said pair of jacking rods are joined between said clamp and respective ones of said second cross member distal ends for translating said hook.

7. A tool according to claim 6 wherein said jacking rods comprise jacking screws extending through respective apertures in said second cross member distal ends.

8. A tool according to claim 7 wherein said jacking means are effective for translating said hook toward said receptacle so that said cross member contacts said endcap distal end to insert said endcap into said receptacle.

9. A tool according to claim 8 wherein said jacking means include a pair of jacking nuts disposed on respective ones of said jacking screws against a top surface of said second cross member, and being rotatable for jacking said hook, and in turn jacking said endcap into said receptacle.

10. A tool according to claim 7 wherein said jacking means are effective for translating said hook away said receptacle so that said first cross member flanges contact said endcap flanges to withdraw said endcap from said receptacle.

11. A tool according to claim 10 wherein said jacking means include a pair of jacking nuts disposed on respective ones of said jacking screws against a bottom surface of said second cross member, and being rotatable for jacking said hook, and in turn jacking said endcap out of said receptacle.

* * * * *